United States Patent Office 3,521,423
Patented July 21, 1970

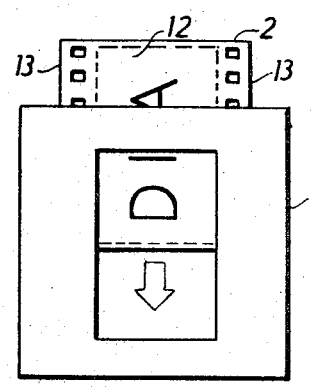
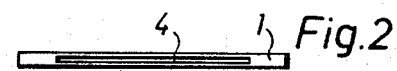
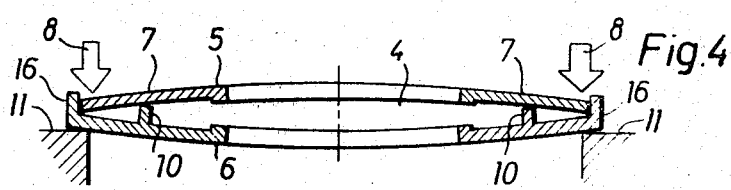
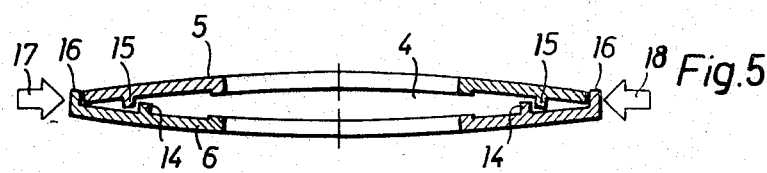
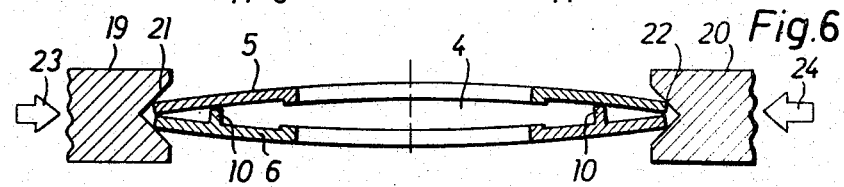
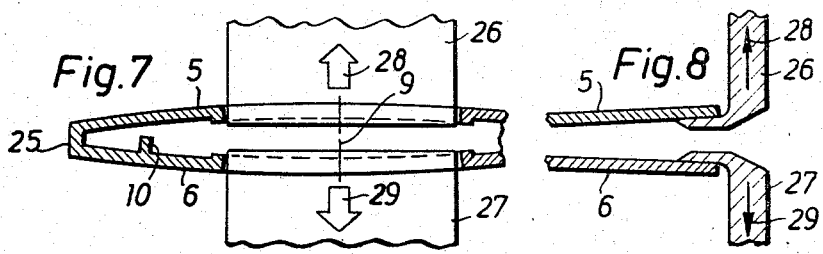
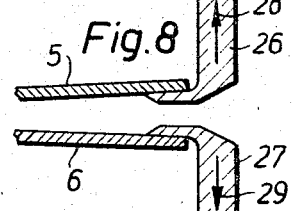

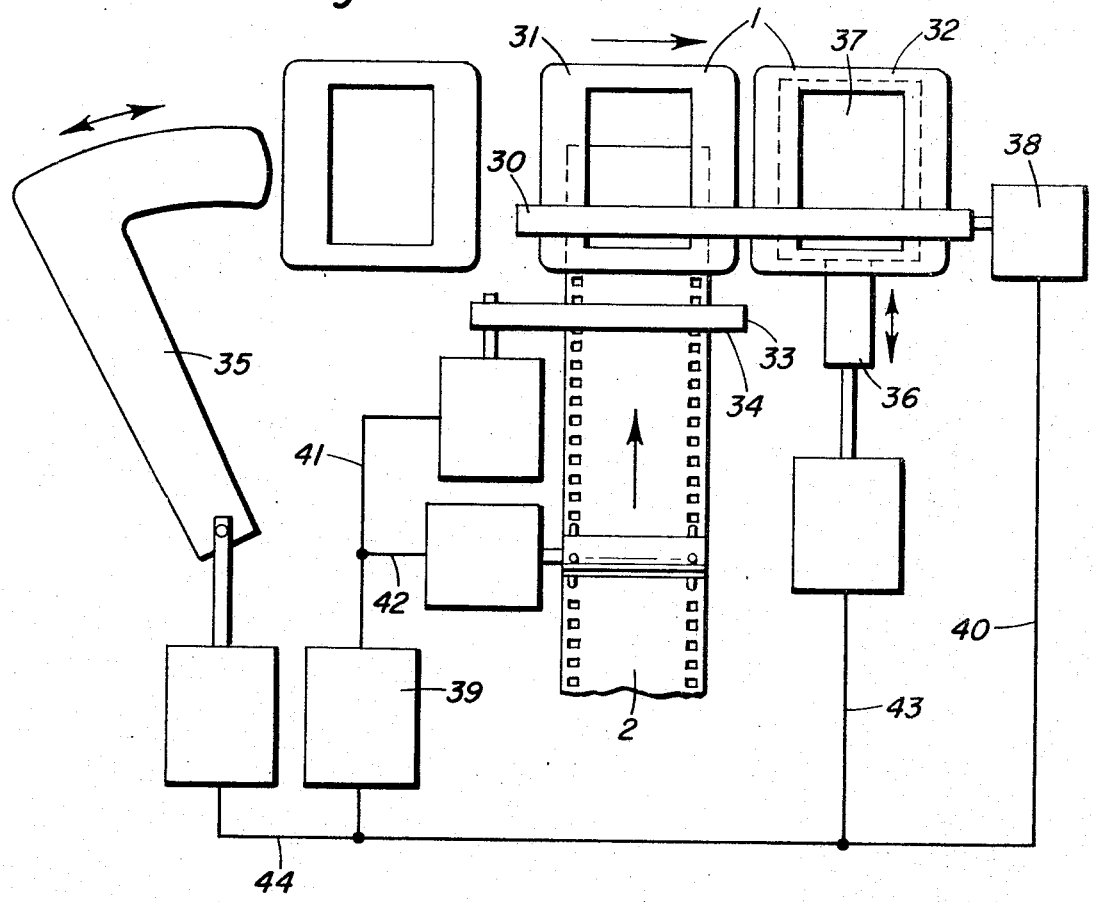
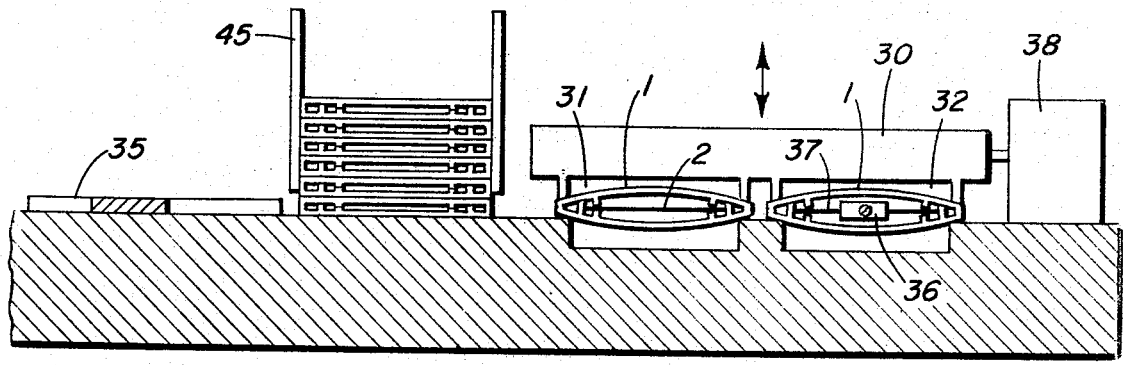

3,521,423
TRANSPARENCY FRAMES AND METHOD FOR MOUNTING TRANPARENCIES THEREIN
Hans-Hermann Koeppe, Wiesbaden-Schierstein, and Otfried Urban, Medenbach, Taunus, Germany, assignors to Geimuplast Peter Mundt KG, Garmisch-Partenkirchen, Germany, a corporation of Germany
Continuation-in-part of application Ser. No. 290,142, June 24, 1963, now Patent No. 3,369,338. This application July 14, 1967, Ser. No. 653,458
Claims priority, application Germany, June 22, 1962, A 40,501
Int. Cl. B65b 63/00, 1/06, 61/20
U.S. Cl. 53—23                                  2 Claims

ABSTRACT OF THE DISCLOSURE

A process for mounting transparencies into a flexible resilient frame having a slot extending through at least one end of the frame. The frame is deformed within its elastic limit to widen the slot and the transparency is partially inserted within the widened slot so that the possibility of marring it is reduced. The forces on the frame are then removed causing the frame to grip the partially inserted transparency. The part of the transparency protruding from the frame is cut after which forces are reapplied to the frame again widening the slot after which the transparency is pushed to a fully seated position and the deforming forces again removed so that the frame frictionally engages the fully seated transparency.

REFERENCE TO OTHER PATENT APPLICATIONS

This patent application is a continuation-in-part application of the application of Hans-Hermann Koeppe et al., Ser. No. 290,142 filed June 24, 1963, now Pat. No. 3,369,338, issued Feb. 20, 1968, for Transparency Frames and Method for Mounting Transparencies Therein with common assignee.

BACKGROUND

Many techniques and apparatus have been employed to mount transparencies in flexible frames. In the past, when these apparatus were used to mount transparencies in plastic frames, it was found that the frame would often mar or scratch the surface of the transparency to the detriment of the quality of the final assembly. Attempts to avoid the problem includes covering the transparency with various materials which are carried into the frame with the transparency and upon final seating thereof are withdrawn hopefully without changing the seating of the transparency. However, this technique is cumbersome and has obvious deficiencies.

With this advent of the invention disclosed in U.S. patent application Ser. No. 290,142 filed June 24, 1963, a practical and safe method for seating the transparencies within a plastic frame was presented for the first time. Specifically, this method includes application of forces so as to deform the frame and thus widen the slot into which the transparency is inserted. With this technique, the chances of marring the transparency surface are significantly reduced without the need of protective coverings for the transparency.

As is generally known, the individual transparencies are normally cut from the end of a film roll and to avoid the necessity of handling many individual transparencies, it is preferred that the cutting thereof be accomplished just prior to the final seating of the transparency. With this result in mind, a problem has arisen as to how to maintain positive and efficient control on a transparency from the time it is severed from the roll and to when it is fully seated in a slot of the type described.

The present invention overcomes the difficulty and provides a new and improved technique and apparatus for severing and seating a transparency by positively controlling the motion of the transparency from the time of severing to the full seating thereof within the frame, without the need for handling the transparency as a separate film piece until it is partially seated within the frame.

Stated briefly, the technique and apparatus of the invention apply forces to the frame to which the transparency receiving slot therein. The feeding end of a film roll is advanced so that its free end is partially inserted within the thus widened frame with very little chance of marring or scratching the transparency surface as described. The forces on the frame are then removed so that the frame slot frictionally engages or clamps the partially seated transparency. When positive retention is achieved, the exposed transparency part (that is still connected to the film roll) is severed at the appropriate length. After severing, the forces are reapplied to the resilient frame to deform the same and thus widen the slot a second time. The transparency is then urged further into the thus widened slot for final seating therein. The deforming forces are then removed so that the frame again positively engages the transparency and the assembly is complete.

It is therefore an object of the invention to provide a method and apparatus which avoids the problems and achieves the advantages as described above.

DESCRIPTION OF THE DRAWINGS

Other and further objects and advantages of the invention will become apparent with the following detailed description when taken in view of the appended drawings in which:

FIG. 1 is a diagrammatic plan view of the frame of the invention showing also a transparency during introduction thereof into the frame.

FIG. 2 illustrates the edge portion of the frame of the invention which is provided with the slot through which the transparency is introduced into the frame;

FIG. 3 is an enlarged sectional illustration of one embodiment of a frame according to the present invention.

FIG. 4 shows part of the process of the invention for introducing the transparency into the frame of FIG. 3.

FIG. 5 is a sectional view of another embodiment of a frame according to the present invention. FIG. 5 also illustrates diagrammatically the manner in which the frame of FIG. 5 is acted upon according to the method of the invention for introducting a transparency into the frame.

FIG. 6 shows, in a sectional view, still another embodiment of a frame according to the invention as well as part of a structure for acting on the frame to deform the latter in connection with the mounting of a transparency in the frame.

FIG. 7 is a fragmentary sectional view of still another embodiment of a frame according to the present invention. FIG. 7 also fragmentarily illustrates jaws of a manually operable tong structure applied to the frame for deforming the latter in connection with the introduction of a transparency into the frame.

FIG. 8 is a transverse, fragmentary view of the structre of FIG. 7 showing further details of the jaws of FIG. 7.

FIG. 9 is a schematic plan view of a machine for framing transparencies according to the method of the invention.

FIG. 10 is a schematic transverse sectional view of part of the structure of FIG. 9.

Referring to FIG. 1, there is shown therein, in a diagrammatic manner, a frame 1 which, as is indicated in FIG. 2, is formed with a slot 4 through which a transparency 2 can be introduced into the frame by moving the transparency through the slot 4 with respect to the frame in the direction indicated by the arrow in FIG. 1.

As may be seen from FIG. 3, the frame includes a pair of substantially coextensive frame portions 5 and 6 which are of a generally rectangular configuration and which are formed with aligned rectangular openings through which the picture carried by the transparency will be visible. The frame portions 5 and 6 are made of a resilient flexible material, such as any suitable plastic, cardboard, or the like, and these frame portions 5 and 6 are connected to each other with a suitable glue, or in the case of plastic frame portions, they may be fused to each other by applying heat to suitable parts of the frame portions so that these parts will flow into each other and upon solidification will unite the frame portions. In the illustrated example the frame portion 5 is substantially flat while the frame portion 6 has at its outer periphery a flange 16 which may surround the outer periphery of the frame portion 5. The frame portion 6 integrally carries a pair of spacer ribs 10 which respectively extend parallel to the opposed side edges of the frame portion 6 which are shown at the right and left of FIG. 3. The surfaces of the ribs 10 distant from the frame portion 6 engage the inner surface of the frame portion 5 to determine the space between the frame portions, and the frame portion 5 is fused to the spacer ribs 10 so that it is through these ribs 10 that the frame portions are also connected to each other in the illustrated example. Thus, while the flange 16 of the frame portion 6 overlaps the periphery of frame portion 5, this periphery of the frame portion 5 can be moved relative to the flange 16. The pair of ribs 10 and the parallel side edges of the frame portions extend perpendicularly with respect to the slot 4 which is defined between the frame portions in the manner indicated in FIG. 3; FIG. 4 shows at 7 the areas where the frame portions 5 and 6 are connected to each other.

The method of the invention which is illustrated in FIG. 4 involves placing the frame portion 6 on a pair of supports 11 which extend along the right and left edges of the frame, as viewed in FIG. 4, and which extend beneath the frame in the manner indicated in FIG. 4. With the frame thus mounted on the pair of supports 11 the operator need only depress the opposed side edges of the frame portion 5 toward the frame portion 6, so that the frame portions will be deformed in the manner indicated in FIG. 4 from which it is apparent that the forces 8 which extend perpendicularly to the plane to be occupied by the transparency bulge the frame portions 5 and 6 outwardly away from each other widening the slot 4 so that with the frame maintained in the condition illustrated in FIG. 4 the transparency can be slipped into the frame without any possibility of marring the surface thereof, particularly the surface where the picture is located, and after the transparency has been introduced into the frame the forces 8 can be removed so that the frame will spring back to its unstressed condition holding the transparency in the frame. It will be noted that with this arrangement the transparency need only engage the frame along the perforated side edges 13 of the transparency so that the picture area 12 thereof need never come in contact with the frame. The forces 8 may be applied either through the operator's fingers or with any suitable tool, and of course the method of FIG. 4 may be performed by a suitable machine. It will be noted that the forces 8 extend parallel to the optical axis 9.

During introduction of the transparency the portions of the space between the frame portions 5 and 6 where the edge portions 13 of the transparency are located are narrower than the portion of the slot which receives the part of the transparency between its perforated side edges, so that the transparency can be guided in the relatively narrow space portions which receive the side edge portions of the transparency, and once the transparency is properly positioned with the picture area thereof aligned with the central openings of the frame portions, the forces 8 are removed and the frame snaps back to its unstressed condition shown in FIG. 3. It is to be noted that the slot 4 is only shown diagrammatically in FIG. 2. The slot 4 is simply the result of the joining of the frame portions 5 and 6 to each other by the pair of parallel spacer ribs 10, and it will be noted that these frame portions are formed along their central openings with inwardly directed flanges providing the extremely narrow gap 4 extending all around the central openings of the frame portions. Thus, when the frame of FIG. 3 is placed in the condition shown in FIG. 4 the transparency can be introduced through either end of the frame since the gap or slot 4 will be widened in the manner shown in FIG. 4 along the entire length of the frame.

The embodiment of the invention which is illustrated in FIG. 5 includes a pair of frame portions 5 and 6 similar to those of FIGS. 3 and 4 except that in the case of FIG. 5 the peripheral flange 16 of the lower frame portion 6 is fused to the opposed side edges of the frame portion 5 which are situated at the right and left of the frame portion 5, as viewed in FIG. 5. Of course, the flange 16 need not extend all around the periphery of the frame 5, and in fact in the examples illustrated in FIGS. 3–5 the flanges 16 are only located at the illustrated opposite side edges of the frame portion 16. Thus, with the construction of FIG. 5 it is only the opposed side edges of the frame portion 5 which are fused or glued to the pair of opposed flanges 16 of the frame portion 6. Thus, with this embodiment a pair of oppositely directed forces 17 and 18 can be applied to the flange portions 16 displacing them slightly toward each other so as to cause the frame portions 5 and 6 to bulge away from each other in the manner shown in FIG. 5 thus widening the slots or gap 4 to facilitate the introduction of the transparency from either end of the frame in the manner discussed above in connection with FIGS. 3 and 4.

With the embodiment of FIG. 5 the frame portion 6 has a pair of elongated parallel ribs 14 extending toward the frame portion 5, these ribs 14 being parallel to the flanges 16, while the frame portion 5 is integrally formed with a pair of elongated parallel ribs 15 respectively parallel to the ribs 14 and respectively located between the latter and the flanges 16. These spacer ribs 14 and 15 thus limit the movement of the frame portions 5 and 6 toward each other when they return to their unstressed condition where they will have with respect to each other the relative position indicated in FIG. 3. Of course, the ribs 14 are not connected to the frame portion 5 and the ribs 15 are not connected to the frame portion 6, so that these ribs 14 and 15 function on the one hand as spacers and on the other hand to prevent the frame portions 5 and 6 from bulging inwardly toward each other when the forces 17 and 18 are applied to the flanges 16. These forces 17 and 18 may be applied by the fingers of one hand of the operator so that the other hand is free to introduce the transparency, or a suitable machine or tool may be provided for these purposes. It will be noted that with the method of FIG. 5 the forces applied to the frame are directed perpendicularly with respect to the optical axis.

The frame of FIG. 6 is identical with that of FIG. 3 except that the lower frame portion 6 does not have any flanges 16. Thus, the frame portions 5 and 6 of FIG. 6 are fixed to each other by the pair of opposed parallel ribs 10 and in addition these ribs 10 limit the movement of the frame portions toward each other so that in their unstressed condition they will have the positions with respect to each other indicated in FIG. 3. Thus, with this embodiment each of the frame portions has a free peripheral edge, and these coextensive edges of the frame portions are spaced from each other all around the frame portions.

The method of FIG. 6 involves the use of a pair of spreader members 19 and 20 supported on any suitable support means for movement toward and away from each other, these spreader members 19 and 20 extending parallel to the opposed side edges of the frame which are situated to the right and left as viewed in FIG. 6. The spreader members 19 and 20 are respectively formed with elongated V-grooves 21 and 22 which are directed toward each other and which extend parallel to the opposed side edges of the frame, and when the spreader members 19 and 20 are in their rest positions displaced apart from each other by a distance greater than that illustrated in FIG. 6 the frame can be situated between the V-grooves 21 and 22, simply held in this position by the operator, for example. Then the operator will displace the spreader members 19 and 20 toward each other in the manner indicated by the arrows 23 and 24 shown in FIG. 6. Any suitable linkage which can be manually operated may be connected to the members 19 and 20 for displacing them toward each other in the manner indicated in FIG. 6, or one of the members 19 and 20 may be stationary while the other member is displaceable toward and away from the same to achieve the same results. It will be seen that during the reduction in the distance between the pair of members 19 and 20 the free edges at the opposite sides of each frame portion will be forced toward the innermost parts of the grooves 21 and 22 so that the oppositely inclined faces of these grooves displace the opposed side edges of the frame portions toward each other bulging the frame portions outwardly away from each other in the manner indicated in FIG. 6. With the frame in the position shown in FIG. 6 the transparency may be introduced either mechanically or manually, and then the displacement of one or the other of the members 19 and 20 in a direction opposite to that indicated by the arrows will release the frame portions which spring back to their initial unstressed conditions where they have with respect to each other the relationship indicated in FIG. 3 retaining the transparency in the frame by the resilient pressure exerted on the opposed faces of the transparency by the lips of the frame portions which extend along their central openings as described above and as shown in FIG. 3.

With the embodiment of the invention which is illustrated in FIGS. 7 and 8, the frame portions 5 and 6 are connected to each other by a pair of opposed flanges 25 located at the right and left edges of the frame, as viewed in FIG. 7, and these flanges 25 are integral with the frame portions 5 and 6. The frame portion 6 carries a pair of elongated parallel ribs 10 which are parallel to the opposed connecting flanges 25 and which only engage the frame portion 5 so as to determine the space between the frame portions 5 when they are in their unstressed condition. With this embodiment it is of course possible to use either the method of FIG. 5 or that of FIG. 6. It should be noted that the V-grooves of FIG. 6 even if they do not displace the edges of the frame portions toward each other, since they could not perform this function with the frame of FIG. 7, are nevertheless capable of displacing the opposite frame edges toward each other to produce the results indicated in FIGS. 5 and 6. Of course in the embodiments of FIGS. 5 and 7 where the frame portions are connected to each other only at their opposed side edges it is possible to widen the slots at the opposed ends of the frame to an extent greater than with the embodiments of FIGS. 4 and 6 since in these latter embodiments the ribs 10 connect the frame portions to each other along lines which are located closer to each other than the opposed side edges of the frame. In the embodiment of FIG. 5 the ribs 14 and 15 can respectively move away from the frame portions 5 and 6, while in the embodiment of FIG. 7 the ribs 10 can move away from the frame portion 5 so that with the embodiments of FIGS. 5 and 7 a greater widening of the slots at the ends of the frame is possible than with the embodiments of FIGS. 4 and 6 where the spacer ribs also connect the frame portions to each other.

With the embodiment of FIGS. 7 and 8, instead of using the methods illustrated in FIGS. 5 and 6 it is possible to use a hand tool in the form of tongs or pliers constructed in a well known manner so that when the operator applies pressure to the handles of the tool the jaws thereof move apart from each other. These jaws 26 and 27 have relatively narrow free end portions extending substantially perpendicularly with respect to the directions 28 and 29 in which the jaws are displaced respectively away from each other by manipulation of the hand tool, and these narrow portions of the jaws are introduced into the slot at one end of the frame whereupon the tool is manipulated to have its jaws 26 and 27 respectively displaced in the directions 28 and 29 so as to spread the frame portions 5 and 6 away from each other, thus widening the slot. With the frame maintained by the operator in the condition indicated in FIGS. 7 and 8 the operator can slip the transparency between the jaws and frame portions into the space between the latter aligning the picture with the openings of the frame portion whereupon the operator releases the hand tool so that its jaws are pulled toward each other, and the hand tool may be provided with a suitable spring for this purpose. The operator then withdraws the jaws from the slot and the frame portions 5 and 6 return to the position illustrated in FIG. 3 with respect to each other retaining the transparency in the frame.

While in the above description reference has been made to manual operations, it is of course possible to provide any machine which may be manually or automatically operated to effect the steps which are performed manually.

It will be noted that with the embodiment of FIGS. 7 and 8 the frame portions 5 and 6 are spread apart from each other at only one end of the frame so that at the opposite end of the frame the frame portions 5 and 6 are hardly displaced with respect to each other, and this feature facilitates the positioning of the transparency within the frame since the leading end of the transparency as it moves into the frame will encounter a substantially closed end of the frame. Of course, with the methods of FIGS. 4–6 it is not necessary to apply the forces indicated along the entire lengths of the opposed side edges of the frame. Thus, the forces 8 may be applied to the opposed side edges of the frame at one end thereof, and the same is true of the forces 17 and 18 of FIG. 5. As for FIG. 6, the spreader members 19 and 20 can have a length substantially less than the length of the opposed side edges of the frame and can also engage the latter at one end thereof to spread the slot 4 at one end of the frame, so that in this way the frame will be deformed with the embodiment of FIGS. 4–6 in substantially the same way as with the embodiment of FIGS. 7 and 8.

Referring now to FIGS. 9 and 10, there is schematically illustrated therein a machine for automatically or semi-automatically framing transparencies. As may be seen from FIG. 10, a pair of frames 1 having the structure shown in FIG. 4 are acted upon by the bottom projections of the bar 30 so that these frames have the position indicated in FIG. 4, the bar 30 providing the forces 8 of FIG. 4 in the position of the bar 30 shown in FIG. 10, and of course the bed of the machine provides supports 11 as indicated in FIG. 4. Thus, a pair of frames are situated opposite each other at a pair of stations 31 and 32, and it will be noted from FIG. 9 that the bar 30 acts on the frames only adjacent one end portion thereof to produce results similar to that described above in connection with FIGS. 7 and 8 with respect to widening of the slot at one end of the frame. The spaces beneath the frames at the stations 31 and 32, shown in FIG. 10, are aligned only with the end portions of the frames worked on by the bar 30, so that these spaces are spaced only in the region beneath the bar 30, and thus the frames are capable of sliding freely on the top surface of the bed of the machine from left to right, as indicated by the arrow at the upper part of FIG. 9. It is to be noted that instead of the bar 30, other structures may be provided to produce the actions described above in connection with FIGS. 5–8.

A film strip 2 which carries the transparencies is advanced toward the working stations 31, as indicated by the arrow shown in FIG. 9 on the film strip 2. It is to be noted that at the station 31 the transparency is inserted only part of the way into a frame which is at the station 31. The portion of the transparency which still extends from the frame at the station 30 is severed from the remainder of the strip 2 by a cutter 33 which has a cutting edge 34 which cuts across the film strip to sever the latter between the transparencies.

As is shown at the left of FIG. 9, a pusher 35 reciprocates back and forth, and when this pusher swings in a clockwise direction as viewed in FIG. 9, the free end thereof will displace a frame from beneath the magazine 45 shown schematically in FIG. 10, and this frame, guided by suitable unillustrated guides, will advance to the right displacing the frame at the station 31 to the station 32 and displacing the frame at the station 32 away from the latter to a suitable collecting station, the frame at the station 32 being displaced into a suitable receptacle, for example. In this way at each clockwise swing of the pusher 35 a frame at the station 32 will be displaced therefrom, while the frame at the station 31 will be displaced to the station 32, and an empty frame will have been displaced by the pusher from the magazine 45 to the station 31. During the return swing of the pusher 35 it simply slides away from the stack of frames in the magazine 45 to permit the stack to drop to the position indicated in FIG. 10 where the next empty frame is in a position to be displaced at the station 31 on the next operating cycle. After the cutter 33 has cut across the film and been raised therefrom, the bar 30 is also raised from the frames and the actuation of the pusher 35 takes place to shift the frames with respect to the work stations in the manner described above. Before the cutter 33 cuts the film, the bar 30 of course has been lowered to the position shown in FIG. 10 and the leading end portion of the film strip has been introduced into the empty frame at the station 31, while simultaneously the pusher bar 36 at the station 32 completes the movement of the transparency into the frame so that the transparency 37 will be properly introduced fully into the frame, as indicated in FIG. 9. The pusher 36 is then retracted in preparation to engage the projecting end of the next transparency in the frame which is transported to the station 32 during the next operating cycle in the manner described above.

Thus, the parts shown in FIGS. 9 and 10 operate in a given sequence through a given cycle to automatically frame the transparencies of the film strip 2. As is schematically shown in FIG. 9, the controls are derived from a control unit 39 connected either electrically or mechanically through the means 40 with the structure 38 which raises and lowers the bar 30, through the means 43 with the structure which reciprocates the pusher 36, through the means 42 with the structure for rotating the sprockets which advance the film strip 2, through the means 41 with the structure for actuating the cutter 33, and through the means 44 with the structure for swinging the pusher 35.

During clockwise swinging of the pusher 35 to shift the frames, the elements 30, 36 and 33 do not operate, and of course the film strip 2 remains stationary. During retraction of the pusher 35, the bar 30 will be lowered to widen the slots at the ends of the frames at the stations 41 and 32, and while the bar 30 remains in its lower position shown in FIG. 10, the film 2 will be transported to partly introduce the next transparency into the frame at the station 31, whereupon the cutter 33 will be actuated and returned to its idle position, and simultaneously the pusher 36 will be advanced and retracted so as to complete the insertion of the transparency. It will be noted that with this structure the transparency is never moved relative to the frame except when the slot thereof, through which the transparency is introduced, is in its widened condition, so that any marring of the transparency is reliably avoided.

It will be understood that each of the elements described above, or two or more together, may also find a useful application in other types of transparency mountings differing from the types described above.

While the invention has been illustrated and described as embodied in transparency frames and methods of manipulating the same, it is not intended to be limited to the details shown, since various modifications and structural changes may be made without departing in any way from the spirit of the present invention.

What is claimed is:

1. A method of mounting a transparency into a frame made of flexible resilient hard plastic material and having at least one slot at one end thereof, comprising the steps of introducing a transparency at a first work station at the end of a film strip partly into a hard plastic frame through the slot thereof while the frame has been deformed in a manner widening said slot with the side edges of the frame guiding the transparency during the introduction thereof; removing the deforming forces at said first work station so that the frame grips the partially seated transparency and cutting the transparency which has thus been partially introduced into the frame from the remainder of the film strip; transporting the frame with the thus cut transparency to a second work station; and subsequently widening the slot a second time at said second work station while completing the introduction of the thus cut transparency into the frame with the side edges of the frame guiding the transparency during the introduction thereof.

2. A method of framing transparencies in flexible resilient hard plastic frames each of which has a slot at at least one end thereof, comprising the steps of widening the slot of a hard plastic frame at a first work station and introducing a transparency at the end of a film strip partially into the frame through the thus widened slot thereof and removing the widening forces so that the frame grips the partially seated transparency with the side edges of the frame serving to guide the transparency during partial seating thereof; cutting the transparency from the film strip at a portion of the transparency which still projects beyond the frame; transporting the frame with the thus cut transparency to a second work station; widening the slot at the second work station and then completing the introduction of the transparency into the frame at the second work station with the side edges of the frame serving to guide the transparency during introduction thereof, while simultaneously widening the slot of a second frame at the first station and partially introducing the next transparency into the same, so that the operations are repeated at both stations on successive frames to automatically introduce transparencies into the same while cutting the transparencies from a film strip.

References Cited

UNITED STATES PATENTS

| 2,725,155 | 11/1955 | Fitch | 53—123 X |
| 3,067,805 | 12/1962 | Flynn | 53—123 X |
| 2,555,218 | 5/1951 | Bailey. | |
| 2,892,295 | 6/1959 | McArthur | 53—123 |
| 2,937,483 | 5/1960 | Engelstein | 53—123 |
| 3,019,579 | 2/1962 | Heckman | 53—123 |
| 3,248,846 | 5/1966 | Engelstein | 53—123 |
| 3,369,338 | 2/1968 | Koeppe | 53—35 |
| 3,429,101 | 2/1969 | Anderson | 53—255 |

WAYNE A. MORSE, JR., Primary Examiner

U.S. Cl. X.R.

53—35, 50, 381; 93—61